May 18, 1943.  R. L. ANDERSON  2,319,714
HARVESTER PLATFORM MOUNTING
Original Filed July 29, 1940
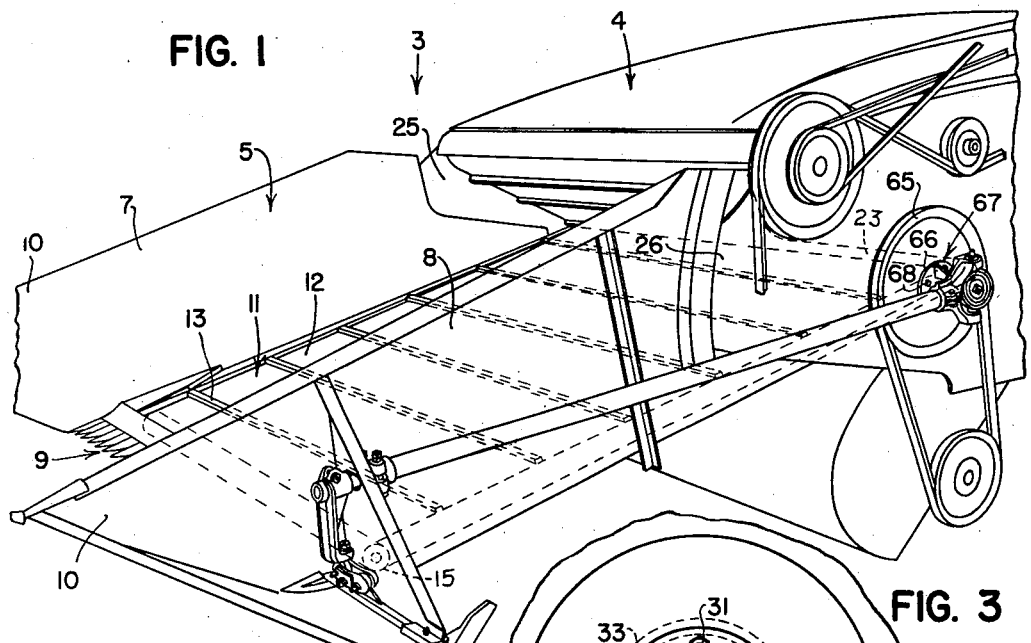
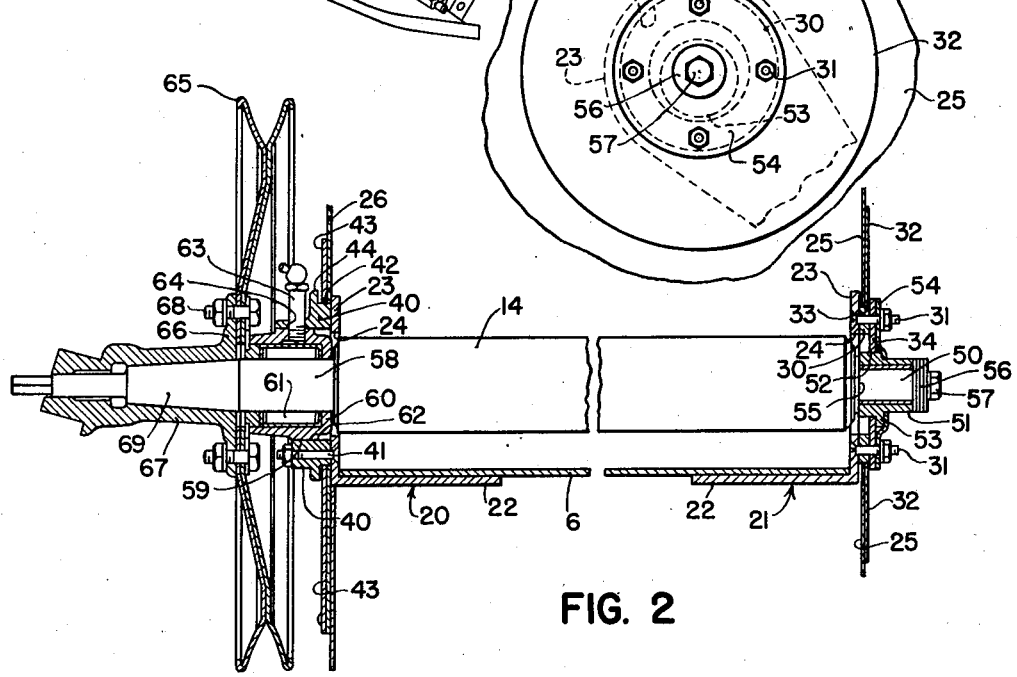
INVENTOR
RALPH L. ANDERSON
ATTORNEYS Patented May 18, 1943

2,319,714

UNITED STATES PATENT OFFICE 2,319,714

HARVESTER PLATFORM MOUNTING

Ralph L. Anderson, Moline, Ill., assignor to Deere & Company, Moline, Ill., a corporation of Illinois Original application July 29, 1940, Serial No. 348,128. Divided and this application November 7, 1941, Serial No. 418,198

8 Claims. (Cl. 198—184)

The present invention relates generally to harvesters, and more particularly to harvesters of the type having a body containing crop treating mechanism such as threshing and separating apparatus and a platform pivotally connected to the body, on which platform is disposed a flexible endless conveyor trained over a roller, which is journaled on the axis of pivotal movement of the platform relative to the body.

The principal object of this invention relates to the provision of novel and improved means for pivotally supporting the harvester platform on the body of the implement and which provides for journaling the conveyor roller on the axis of pivotal movement of the platform. A more specific object relates to the provision of a novel mounting for the platform and roller which permits removing the conveyor roller without dismounting the harvester platform from its pivot support on the body. This application is a division of an application, Serial No. 348,128, filed July 29, 1940, by Anderson, Arnold and Paradise.

These and other objects and advantages will be apparent to those skilled in the art after a consideration of the following description in which reference is had to the drawing appended hereto, in which Figure 1 is a perspective view of a combine of the straight through type, embodying the principles of the present invention;

Figure 2 is a sectional elevational view taken in a vertical plane through the axis of the pivotal connection between the harvester platform and the body of the combine; and Figure 3 is an end view of one of the supporting bearings.

Referring now to the drawing, the combine 3 comprises a thresher body 4, to which a platform 5 is pivotally connected by means which will be made apparent later, providing for vertical swinging movement of the platform about a transversely extending axis.

The platform 5 comprises a sheet metal bottom 6, inclined forwardly and downwardly from the forward end of the body 4 and having substantially vertical side walls 7, 8 at opposite sides thereof, respectively. A conventional cutter bar 9 is mounted transversely across the forward end of the platform and the side walls are extended forwardly of the cutter bar to provide a pair of grain dividers 10.

The crop which is severed by the cutter bar 9 falls upon a platform conveyor 11, which conveys the crops from the cutter bar upwardly and rearwardly and delivers the same to the threshing apparatus within the body 4. The conveyor 11 comprises a flexible endless belt, preferably of fabric 12, on which is secured a plurality of transverse slats 13. The endless canvas 12 is trained over a lower roller 15 disposed transversely behind the cutter bar 9, and at its upper end the canvas 12 is trained over a roller 14.

The platform 5 is supported by a pair of angular plate members 20, 21 fixed to the upper corners of the platform frame, respectively. Each of the angular members has a horizontally disposed flange 22, upon which the platform floor sheet 6 is carried, and an upwardly extending flange 23, to which the side walls 7, 8 are connected, respectively. The vertical flanges 23 are provided with apertures 24, to permit the installation of the upper conveyor roller 14 therethrough, as will be explained presently. The vertical flanges 23 are in effect, extensions of the side sheets 7, 8 and slidably fit within the side walls 25, 26 of the combine body 4.

The outer or grainward platform pivot bearing comprises an annular bearing member 30, which is bolted rigidly to the vertical flange 23 of the angular supporting member 21, by means of a number of bolts 31. The side wall 25 of the body 4 is apertured to receive the annular bearing member 30 and has a reenforcing sheet 32 welded on the outside thereof. The reenforcing sheet 32 is apertured at 33 to form a journal bearing for the bearing member 30, which is thus rotatable therein. A retaining plate 34 is supported on the bolts 31 outside of the reenforcing plate 32 and serves to hold the bearing member 30 in rotatable relation with the side wall 25 of the body 4.

Likewise, the supporting member 20 at the opposite corner of the platform, has an annular bearing member 40 rigidly secured thereto by means of bolts 41. The member 40 has a cylindrical bearing surface 42, journaled within the side wall 26, which is also provided with a reenforcing plate 43 to increase the amount of bearing surface. The side wall 26 is retained on the bearing surface 42 by means of an annular flange 44, formed on the outer circumference of the annular bearing member 40. Inasmuch as the openings in the side walls 25, 26 and reenforcing sheets 32 and 43 are coaxial with respect to the axis of rotation of the upper conveyor roller 14, the vertical swinging movement of the platform takes place about the axis of rotation of the roller 14, and thus the upper end of the conveyor does not change its position with respect to the threshing mechanism as the platform is adjusted to adjust the height of cut.

The grainward end of the conveyor roller 14 is supported on a trunnion shaft 50 which is journaled in a hub member 51. The hub member 51 is supported on the retaining plate 34, which is provided with a centrally disposed aperture 52 to receive the hub member 51, which is provided with a flange 53 disposed in abutment with the retaining plate 34 to maintain the hub member in proper axial position. The member 51 is retained on the shaft 50 by means of a plate 54, which is supported on the bolts 31 and is apertured to receive the hub member, and clamps over the outside of the flange 53, the latter being eccentric in shape to prevent rotation of the hub member relative to the plate 54. Excess axial movement of the roller shaft 50 relative to the hub member 51 is prevented by a shoulder 55 on the end of the roller 14, which bears against the inner end of the hub member 51, and by a plurality of shims or washers 56, which bear against the outer end of the hub 51 and are secured to the end of the shaft 50 by means of a bolt 57, threaded into a tapped opening in the end of the shaft 50.

The opposite end of the roller 14 is supported on a trunnion shaft 58, which is carried in a hub member 60 by means of a roller bearing 61. The exterior surface 59 of the hub member 60 is cylindrical and is slidable into the central opening 62 of the annular bearing member 40, and is held therein against rotation and also against axial movement with respect thereto by means of a lubricating fitting 63. The fitting 63 is inserted through an aperture 64 in the annular bearing member 40 and is threaded into a suitable aperture in the hub member 60. Since both the aperture 62 in the bearing member 40, as well as the aperture 24 in the platform supporting flange 23, are made larger in diameter than the diameter of the roller 14, the latter may be withdrawn through the openings 24, 62 without disturbing the pivotal support of the platform.

The roller 14 can be removed from its mounting by simply removing the bolt 57 in the outer end of the shaft 50 and also the lubricating fitting 63, after which the roller 14 can be withdrawn laterally from the side of the platform.

The platform conveyor is driven through a V-belt pulley 65, which is fixed on a flange 66 of a hub 67 by bolts 68. The hub 67 is tightly mounted on the tapered portion 69 of the trunnion shaft 58.

I claim:

1. In a harvester having a body including a pair of side walls, a platform extending forwardly and downwardly from said body between said side walls, a platform conveyor on said platform including upper and lower rollers and a flexible endless belt trained over said rollers, and means for swingably connecting said platform to said body for pivoting movement about the axis of rotation of the upper roller, comprising an annular bearing support mounted on one of said side walls and having an opening therein adapted for insertion of said roll therethrough during installation and removal, means for mounting said platform on said annular support, and a bearing member on the shaft of said roller and adapted to be carried in the opening in said support.

2. In a harvester having a body including a side sheet and a platform having a side sheet, the combination of means for swingably connecting said platform to said body comprising an annular bearing member, one of said side sheets being fixed to said member and having an aperture in register with the opening in said annular member and the other embracing said member and journaled thereon, and a conveyor roller adapted to be inserted through said annular member during installation and having a bearing embracing the shaft of the roller, said bearing being normally supported within the opening in said annular member.

3. In a harvester having a body including a side sheet and a platform, means for swingably connecting said platform to said body comprising an annular bearing member journaled in said side sheet, a supporting plate fixed to said platform, means securing said plate to said annular member, said plate having an aperture in register with the opening in said annular member, a conveyor roller adapted to be inserted through said annular member during installation, said roller having a shaft and a bearing member journaled thereon, the latter being slidably supported in said annular member, and means securing said bearing member in said annular member.

4. In a harvester including a body and a platform, means for swingably connecting said platform to said body comprising a pair of bearing members journaled one upon the other, one of said members being attached to said body and the other to said platform, a conveyor roller disposed on said platform adjacent said members, and a bearing for rotatably supporting said roller, the inner of said bearing members having an aperture through which said roller and said bearing can be inserted and withdrawn.

5. In a harvester including a body and a platform, means for swingably connecting said platform to said body comprising a pair of cooperative inner and outer bearing members attached to said platform and to said body, respectively, said inner member having a central aperture therein, a conveyor roller adapted to be inserted through said aperture into normal operating position on said platform, a bearing for supporting said roller, and means for mounting said bearing on one of said bearing members.

6. In a harvester including a body and a platform, means for swingably connecting said platform to said body comprising a pair of cooperative inner and outer bearing members attached to said platform and to said body, respectively, said inner member having a central aperture therein, a conveyor roller adapted to be inserted through said aperture into normal operating position on said platform, a bearing for supporting said roller, and means for mounting said bearing on said inner bearing member, said mounting means being detachable providing for dismounting said bearing and removing said roller through said aperture.

7. In a harvester having a body and a platform, said body including a side wall having a circular aperture, said platform having a supporting plate disposed adjacent said wall over said aperture, a bearing member attached to said plate and journaled in said aperture and having a retaining flange adjacent the opposite side of said wall from said plate, there being aligned central apertures in said bearing member and said plate, a conveyor roller adapted to be inserted through said apertures into said platform, a bearing block having an outer surface adapted to seat within said aperture in the bearing member to hold said block in alignment with the axis of movement of said member in the aperture in said side wall, and detachable means for securing said block to said bearing member.

8. In a harvester having a body and a platform, said body including a pair of side walls having circular apertures disposed in axial alignment and a platform disposed between said walls, said platform including a pair of angular supporting plates having inwardly extending flanges for supporting a floor plate and vertical flanges lying adjacent the inner sides of said walls over said apertures, respectively, an annular bearing member journaled in each of said apertures, and secured to the respective vertical flange, there being aligned openings in said vertical flanges and said bearing members, a conveyor roller adapted to be inserted through said openings, a pair of supporting bearings for said roller, and means for removably supporting said bearings on said annular bearing members in register with said openings, respectively.

RALPH L. ANDERSON.